REFERENCING DEVICE FOR GAUGING TURBINE BLADES AND THE LIKE

Filed April 9, 1951 3 Sheets-Sheet 1

INVENTOR.
WILLIAM S. TANDLER
BY Campbell, Brumbaugh, Free & Graves
THEIR ATTORNEYS June 5, 1956 W. S. TANDLER 2,748,490

REFERENCING DEVICE FOR GAUGING TURBINE BLADES AND THE LIKE

Filed April 9, 1951 3 Sheets-Sheet 2

INVENTOR.
WILLIAM S. TANDLER
BY Campbell, Brumbaugh, Free & Graves
THEIR ATTORNEYS

REFERENCING DEVICE FOR GAUGING TURBINE BLADES AND THE LIKE

Filed April 9, 1951

INVENTOR.
WILLIAM S. TANDLER
BY Campbell, Brumbaugh
Free & Graves
THEIR ATTORNEYS United States Patent Office 2,748,490

Patented June 5, 1956

2,748,490

REFERENCING DEVICE FOR GAUGING TURBINE BLADES AND THE LIKE

William S. Tandler, New York, N. Y., assignor, by mesne assignments, to The Warner & Swasey Research Corporation, Cleveland, Ohio, a corporation of Ohio Application April 9, 1951, Serial No. 219,973

7 Claims. (Cl. 33—174)

The present invention relates to gauging apparatus and more particularly to new and improved means for gauging an object to determine the accuracy of a point thereon which serves as a reference with respect to which certain critical dimensions of the object are referred.

It is customary in engineering specifications to define the shape of a piece of irregular contour by specifying its dimensions at a plurality of stations referred to a particular point on the object. In gauging a piece of this kind after manufacture, it is essential to fix accurately the location of the reference point in the gauging device in order that the piece may be gauged at the particular stations established in the specifications.

An object of the invention, accordingly, is to provide new and improved apparatus for gauging the location of a point on a piece to which certain critical dimensions of the piece are referred.

Another object of the invention is to provide new and improved gauging apparatus of the above character which affords a measure of the deviation of a reference point on a piece from specifications established therefor.

A further object of the invention is to provide new and improved gauging apparatus of the above character by means of which a piece can be gauged at a plurality of stations taken with reference to a point on the piece, as defined in specifications for the piece.

These and other objects of the invention are attained by providing gauging apparatus comprising a holder for a piece to be tested and stop means mounted for relative movement with respect thereto. Normally, the apparatus is adjusted so that if a perfect piece were secured in the holder, the stop means would engage the piece at the point thereon to which the dimensions to be gauged are referred. With the apparatus adjusted in this fashion, the accuracy of the location of the refernce point on an ungauged piece is determined by securing the piece in the holder and measuring the relative displacement required between the holder and the stop means to bring the latter into engagement with the piece. Preferably, means is provided for recording the deviation of the reference point from specifications established therefor.

The invention also contemplates the provision of means for gauging a plurality of different reference points on a test piece, each serving as a reference from which a different group of dimensions of the piece are taken.

The invention may be better understood from the following detailed description of a typical embodiment thereof, taken in conjunction with the accompanying drawings, in which:

Fig. 1 is a front view in elevation of gauging apparatus constructed according to the invention for gauging turbine blades and the like;

Figure 3:
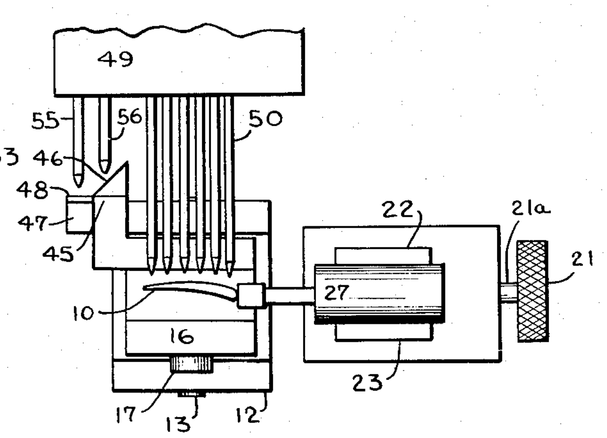
Fig. 3 is a plan view of the apparatus shown in Fig. 1.
Figure 2:
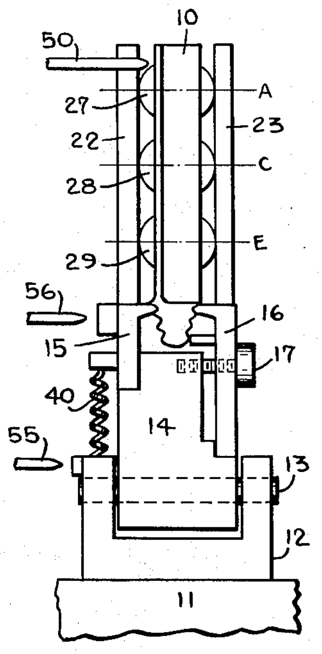
Fig. 2 is a view in side elevation looking from the left of Fig. 1.
Figure 1:
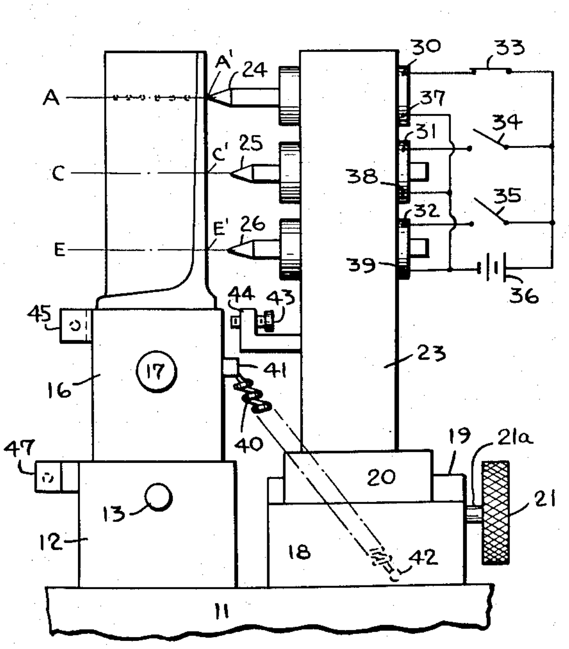

While the invention may be utilized for gauging a wide variety of pieces of different shape, it will be described herein by way of illustration as applied to the gauging of turbine or compressor blades and the like. A typical turbine blade 10 is shown in Figs. 1–3, inclusive. In practice, it is usually desired to gauge the contour of the blade 10 at one or more transverse sections such as those represented by the lines A, C and E (Fig. 1), for example. Usually the contour of the blade 10 at a section line is defined as the perpendicular distance from a chord line to the surface of the blade at a plurality of different stations therealong, all of which stations are referred, for example, to a point on the leading edge of the blade. Thus, for the sections A, C and E, the reference points on the leading edge of the blade 10 might be the points A′, C′ and E′. In order to gauge the contour of the blade 10 at the sections A, C and E, for example, it is necessary to determine whether the reference points A′, C′ and E′ on the leading edge, to which the measurements are referred, are themselves correctly located.

This is accomplished by means of the apparatus shown in Figs. 1–3, inclusive, which comprises a base 11 on which is secured a U-shaped bracket 12 carrying a shaft 13 on which is pivotally mounted a blade holder 14. The blade holder 14 may comprise, for example, opposed jaws 15 and 16, the jaw 16 being adjustable relatively to the jaw 15 by means of an adjusting screw 17 to facilitate the insertion and removal of a turbine blade 10.

Mounted on the base 11 adjacent the holder 14 is a member 18 having guides 19 formed thereon on which a carriage 20 is slidably mounted. The position of the carriage 20 with respect to the member 18 may be adjusted by any suitable means such as, for example, a lead screw (not shown) actuated by an adjusting knob 21.

Secured to the carriage 20 are a pair of upright members 22 and 23 which carry a plurality of stop means such as the knife edges 24, 25 and 26, for example, which are adapted to be moved selectively into engagement with the leading edge of the blade 10 at the points A′, C′ and E′, respectively. Preferably, the knife edges 24, 25 and 26 are normally maintained in retracted position and are adapted to be advanced, one at a time, into engagement with the leading edge of the blade 10, as desired.

Advancement of the knife edges 24, 25 and 26 into engagement with the leading edge of the blade 10 may be effected by means such as the solenoids 27, 28 and 29, respectively, which are carried by the upright members 22 and 23. To this end, the terminals 30, 31 and 32 of the solenoids 27, 28 and 29, respectively, may be connected through switches 33, 34 and 35, respectively, to one terminal of a source of electrical energy such as a battery 36, for example. The other terminal of the battery 36 may be connected to the terminals 37, 38 and 39 of the solenoids 27, 28 and 29, respectively, thereby completing the circuits thereto. With this construction, it will be understood that the knife edges 24, 25 and 26 are normally maintained in retracted position but can be advanced selectively into engagement with the leading edge of the blade 10 by operation of the switches 33, 34 and 35, respectively.

The blade 10 is adapted to be urged towards the knife edges 24, 25 and 26 by means such as a tension spring 40, for example, one end of which is secured to the holder 14 at 41, and the other end of which is secured to the member 18 at 42. Also, stop means such as an adjusting screw 43 in a bracket 44 secured to the upright 23 is provided for restricting movement of the blade holder 14 under the influence of the spring 40.

As will be described in greater detail hereinafter, the gauging apparatus is initially adjusted so that when a perfect blade is inserted into the holder 14, the longitudinal axis of the blade will be in the correct position required by its design. Under these conditions of adjustment, when a faulty blade is inserted in the holder 14, the latter will tend to tilt either to the right or the left in Fig. 1 so that the longitudinal axis of the blade will no longer be in the correct position.

In the form of the invention shown in Figs. 1–3, inclusive, the error in the location of the leading edge of the blade is determined by measuring the amount of tilt of the holder 14. For this purpose, the holder 14 carries an anvil 45 having a surface 46 which is disposed at an angle to the plane in which tilt of the holder 14 occurs. It will be understood that the amount of tilt of the holder 14 can be measured by measuring the distance from a fixed point to the surface 46 along a line perpendicular to the plane in which tilt of the holder 14 occurs. The bracket 12 carries an anvil 47 having a surface 48 disposed parallel to the plane in which tilt of the holder 14 occurs, which serves as a reference for the tilt measurement.

While the contour of the blade 10 as well as the distance to the surfaces 46 and 48 of the anvils 45 and 47 may be determined by conventional means, such as dial gauges, for example, it is preferred to use an automatic recording gauge of the type disclosed in the copending application Serial No. 16,536, filed March 23, 1948, for "Indicating, Signalling and Recording Gauges," by William S. Tander, David S. Walker and Morris Grossman. As shown schematically in Fig. 4, a system of this type comprises a gauging head 49 which is adjustable to different elevations and is movable towards and away from a blade 10 and which carries a plurality of probe elements 50. The probe elements 50 are so located that they will engage the surface of the blade 10 at specified stations taken with reference to the leading edge of the blade. The measurements are adapted to be recorded by a recording head 51 which is adapted to move transversely across a record strip 52 in strict accordance with at least the terminal portion of the movement of the gauging head 49. The recording head 51 carries a plurality of recording stylii 53 equal in number to the probes 50 carried by the gauging head 49. Each of the stylii 53 is in electrical contact with the record strip 52 and the latter is of the type in which a record is made whenever electric current is passed through it.

Each of the probes 50 is connected in an electrical circuit (not shown) including a source of current and the conducting blade 10 so that when any probe 50 engages the face of the blade 10 an electric signal is generated. The electric signals produced as each of the probes 50 engages the blade 10 are amplified by conventional amplifier means 54 which causes current to be supplied to the corresponding stylii 53, thereby recording a corresponding series of dots on the record strip 52.

Figure 4:
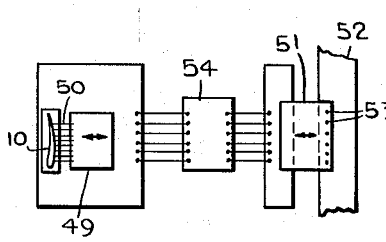
Fig. 4 is a schematic diagram of a typical gauging system of which the gauging apparatus shown in Figs. 1–3, inclusive, may be a part.

The present invention may be embodied in a gauging system of the type shown in Fig. 4 by providing two additional probes 55 and 56 on the gauging head 49 (Fig. 3), which are adapted to be moved into engagement with the surfaces 46 and 48, respectively, of the anvils 45 and 47, respectively. Corresponding stylii 57 and 58 are mounted on the recording head 51 (see Figs. 5C, 6C and 7C).

Figure 5C:
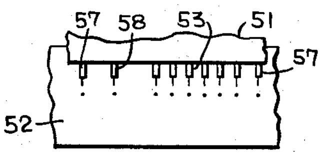
Figs. 5C, 6C and 7C are typical records such as might be obtained with the apparatus of Fig. 1 for the three blades shown in Figs. 5, 6 and 7, respectively.
Figure 5B:
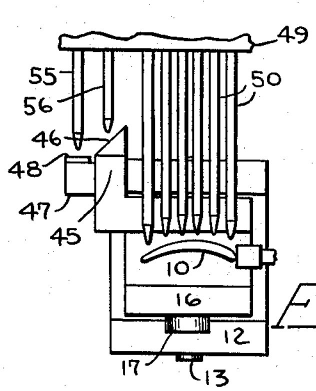
Figs. 5B, 6B and 7B are plan views of the positions of the apparatus shown in Figs. 5A, 6A and 7A, respectively.
Figure 5:
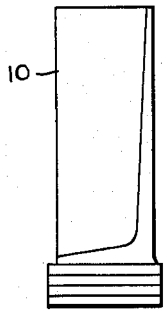
Figs. 5, 6 and 7 illustrate three different types of turbine blade conditions shown that might be encountered in practice.
Figure 5A:
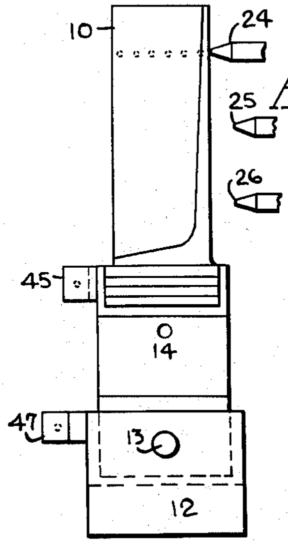
Figs. 5A, 6A and 7A show the positions assumed by the holder in the apparatus of Fig. 1 when each of the blades shown in Figs. 5, 6 and 7 is mounted therein.

In a preferred operating procedure, the knife edge 24 is advanced to the operating position by closing the switch 33. The position of the carriage 20 is then initially adjusted so that with a perfect blade in the holder 14 the blade is held with its longitudinal axis in the proper position as required by its design. The probes 50 are adjusted so that their tips lie along a line corresponding to the correct contour for the turbine blade which is to be gauged and the positions of the probes 55 and 56 are adjusted so that they will engage the surfaces 48 and 46, respectively, of the anvils 47 and 45, respectively, at substantially the same instant the probes 50 simultaneously engage the surface of the test blade 10. A perfect blade is shown in Fig. 5 and the position of the holder 14 with the blade mounted in it is shown in Fig. 5A. The record produced by the gauging apparatus is shown in Fig. 5C from which it appears that the dots produced by the stylii 53 on the recording head 51 all lie in a straight line.

Figure 6C:
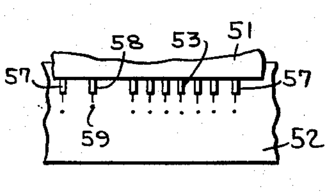
Figure 6B:
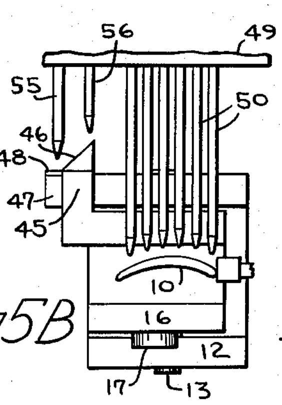
Figure 6:
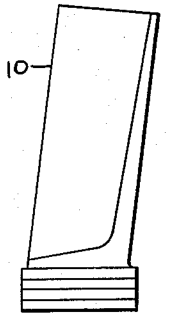
Figure 6A:
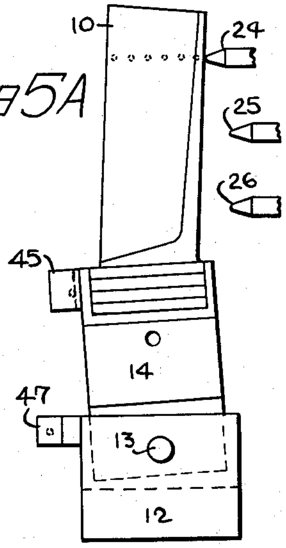
Figure 7C:
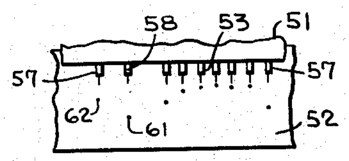
Figure 7B:
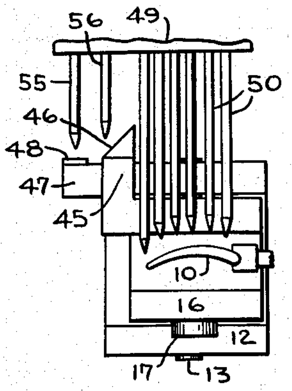

If now, a faulty blade of the type shown in Fig. 6, in which the leading edge tilts forwardly more than it should, is substituted for the correct blade, the holder 14 will be tilted to the left, as shown in Fig. 6A. Under these conditions, the stylus 56 will engage the surface 46 of the anvil 47 before the stylus 55 engages the surface 48 of the anvil 47 so that the dot 59 produced by the stylus 58 on the recording head 51 will occur above the line of dots produced by the other stylii, as shown in Fig. 6C. The record obtained, therefore, indicates that the contour of the blade is correct but that the leading edge is in error. Further, the perpendicular distance from the dot 59 to a line through the reference dots made by the stylii 57 is a measure of the error in the locations of the leading edge.

Figure 7:
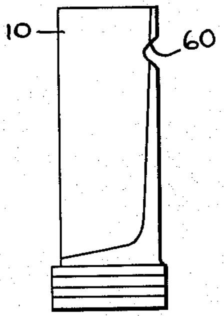
Figure 7A:
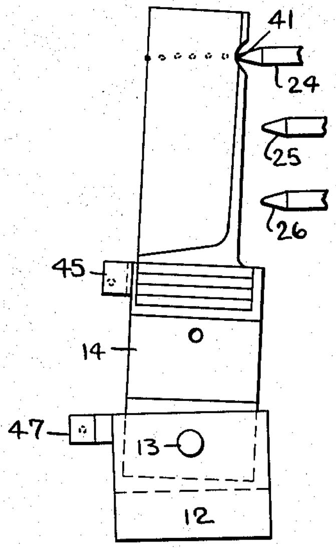

If the blade 10 has a depression 60 formed in the leading edge thereof at the level where it would engage the knife edge 24, as shown in Fig. 7, the holder 14 will be tilted to the right as shown in Fig. 7A. Under these conditions, the dot 61 produced by the stylus 58 on the recording head 51 will lie below the reference dot 62. Further, since the location of the reference point A' is considerably in error, the dots produced by the remaining stylii corresponding to the gauging probes on the gauging head 49 will appear to indicate that the contour is not correct. However, by adjusting the position of the knife edge 24 by means of the knob 21 (Fig. 1) and making a record after each adjustment, the longitudinal axis of the blade 10 can be brought into the correct position, at which point the dots produced by the stylii corresponding to the gauging probes on the gauging head 49 will lie substantially along a straight line if the contour of the blade is correct. The amount of adjustment of the knob 21 required to effect this result will then be a measure of the depth of the depression in the leading edge of the blade 10. By exploring in this fashion, it is possible to determine whether or not an error in the record obtained results from an error in the leading edge of the blade or from a depression or bump therein.

After a blade has been gauged along the section line A, it can be gauged along the section lines C and E by opening the switch 33 and making separate gauging runs first with the switch 34 closed and then with only the switch 35 closed.

The invention thus provides new and improved apparatus by means of which the location of a reference point on a test piece, to which other dimensions of the piece are referred, may be gauged. By virtue of the novel construction described above, this may be accomplished at the same time that the contour of the object is being gauged. Further, by providing for adjustment of the position of the knife edges which engage the leading edge of the blade, it is possible to explore the leading edge of the blade and determine whether or not depressions or bumps or the like are present.

The specific form of the invention disclosed herein by way of example is obviously susceptible of modification within the spirit of the invention. For example, conventional dial gauges or other similar means may be used for making the gauging measurements instead of the recording means described above, although the latter is preferred. Also, the holder 14 may be mounted for translatory movement towards the knife edges 24, 25 and 26, instead of the tilting movement shown. Other modifications will suggest themselves to those skilled in the art. The invention, therefore, is not to be limited save as defined in the accompanying claims.

I claim:

1. In gauging apparatus, the combination of stationary stop means, a holder for a piece to be gauged mounted for movement in a plane towards and away from said stop means, means urging said holder towards said stop means, a first member carried by said holder and having a surface inclined at an acute angle to the plane of movement thereof, a second member carried by said holder and having a surface disposed parallel to the plane of movement thereof, first and second probe means mounted for movement as a unit towards the surfaces of said first and second members, respectively, a record strip, first and second recording means movable as a unit relatively to said record strip in accordance with the movement of said first and second probe means, and circuit means for causing said first and second recording means to record on the record strip when said first and second probe means engage the surfaces of said first and second members, respectively.

2. In gauging apparatus, the combination of a stationary member carrying at least one normally retracted stop means, means for advancing said stop means to a predetermined operating position, a holder for a piece to be gauged mounted for movement in a plane towards said stop means, means normally urging said holder towards said stop means, means to adjust the position of said stationary member relatively to the holder, a first member carried by said holder and having a surface inclined at an acute angle to the plane of movement thereof, a second member carried by said holder and having a surface disposed parallel to the plane of movement thereof, first and second probe means mounted for movement as a unit towards said first and second members, respectively, a record strip, first and second recording means movable as a unit relatively to said record strip, and circuit means for causing said first and second recording means to record on the record strip when said first and second probe means engage the surfaces of said first and second members, respectively.

3. In gauging apparatus, the combination of stationary stop means, a holder for a piece to be gauged mounted for movement in a plane towards and away from said stop means, means urging said holder towards said stop means, a member carried by said holder and having a surface inclined at an acute angle to the plane of movement thereof, a first group of probe means mounted for movement as a unit to engage the face of a test piece in the holder and disposed at locations corresponding to different stations on the test piece at which measurements are to be made, additional probe means movable with said group and adapted to be moved into engagement with the surface of said member, a record strip, a group of recording means movable as a unit relatively to said record strip in accordance with the movement of said group of probe means and corresponding to the probe means in said group, respectively, another recording means movable with said group of recording means, and a plurality of circuit means for causing each of the recording means in said group to record on the record strip when the corresponding probe means engages the test piece in said holder, and for causing said another recording means to record on the record strip when the probe means corresponding thereto engages the surface of said member.

4. In gauging apparatus, the combination of a stationary member carrying a normally retracted stop, means for advancing said stop to a predetermined operating position, a holder for a piece to be gauged mounted for pivotal movement in a plane towards and away from said stop means about an axis near the base thereof, means normally urging the free end of said holder towards said stop means, means to adjust the position of said stationary member relatively to the holder, a first member carried by the holder and having a surface inclined at an acute angle to the plane of movement thereof, a second member carried by the holder and having a surface disposed substantially parallel to the plane of movement thereof, a group of probe means movable as a unit to engage a test piece in the holder and adjustable to different elevations relative to said holder, said probe means being disposed at locations corresponding to stations on the test piece at which measurements are to be made and with their tips lying along a line corresponding to the correct contour for the test piece, another pair of probe means movable with said group of probe means and adapted to be moved into engagement with the surfaces of said first and second members, a record strip, a group of recording means movable as a unit relatively to said record strip and corresponding to said group of probe means, an additional pair of recording means movable with said group of recording means and corresponding to said additional pair of probe means, and a plurality of control circuit means for causing each recording means to record on the record strip as the corresponding probe means comes into engagement with the test piece or with the surfaces of said first and second members as the case may be.

5. In gauging apparatus, the combination of stationary stop means, a holder for supporting a piece having a portion to be gauged, said holder being mounted for movement in a plane towards and away from said stop means, means urging said holder towards said stop means to bring said portion and said stop means into an engagement condition, a member carried by said holder and having a surface inclined at an acute angle to the plane of movement thereof, probe means displaceable substantially normal to said plane and between disengagement and engagement positions with said inclined surface, means for moving said probe means between disengaged and engaged position therefor, a record strip, recording means movable relatively to said record strip in accordance with the movement of said probe means, and electric circuit means for causing said recording means to record on the record strip when the probe means undergoes a change between a disengaged and an engaged condition with said inclined surface.

6. In gauging apparatus, the combination of stationary stop means, a holder for supporting a piece having a portion to be gauged, said holder being mounted for movement in a plane towards and away from said stop means, means urging said holder towards said stop means to bring said portion of said piece into engagement with said stop means through a holder movement whose amount is determined by a dimensional condition of said portion, a member carried by said holder and having a surface inclined at an acute angle to said plane, probe means movable in a path substantially normal to said plane and intersecting said surface at a point which positionally varies in said path in dependence on the amount of holder movement which has brought about said engagement, the position of said intersection point in said path thus being a measure of said dimensional condition of said portion, means for moving said probe means in said path between in-contact and out-of-contact positions with said surface, means operable in synchronism with the movement of said probe means to undergo a progressive change in condition simulating said movement of said probe means, means responsive to a change from one to the other of in-contact and out-of-contact relations of said probe means and said surface for actuating said simulating means to indicate the point in the progressive change in condition thereof which corresponds to the occurrence of said change in relation, and means for referencing said last-named point to a reference datum to provide a referenced indication of the point where said inclined surface intersects said path of movement of said probe means.

7. In gauging apparatus, the combination of stationary stop means, a holder for supporting a piece having a portion to be gauged, said holder being mounted for movement in a plane towards and away from said stop means, means urging said holder towards said stop means to bring said portion of said piece into engagement with said stop means through a holder movement whose amount is determined by a dimensional condition of said portion, a first member carried by said holder and having a surface inclined at an acute angle to said plane, a second member which is immovable normal to said plane and which has a surface parallel to said plane, first and second probe means movable in first and second parallel paths which are each substantially normal to said plane and which respectively intersect the surfaces of said first and second members, the surface of said second member intersecting said second path at a point representing a reference datum, the surface of said first member intersecting said first path at a point which positionally varies in said first path in dependence on the amount of movement of said holder which has brought about said engagement of said portion of said piece with said stop means, the position of said point in said first path thus being a measure of said dimensional condition of said portion, means for moving said first probe means in said first path between in-contact and out-of-contact positions with the surface of said first member and for moving said second probe means in said second path between in-contact and out-of-contact positions with the surface of said second member, means synchronously operable with the movements of said first and second probe means to undergo first and second progressive changes in condition respectively simulating the movement of said first and second probe means, and means respectively responsive to a change from one to the other of in-contact and out-of-contact relations of said first probe means and the surface of said member, and to a change from one to the other of in-contact and out-of-contact relations of said second probe means and the surface of said second member, for actuating said simulating means to indicate the respective points in said first and second progressive changes in condition which correspond to said first-named change and to said last-named change, said two indicated points conjointly providing a referenced indication of the point where the surface of said first member intersects said first path.

References Cited in the file of this patent

UNITED STATES PATENTS

| | | |
|---|---|---|
| 1,445,631 | Lotz | Feb. 20, 1923 |
| 2,206,853 | Poupitch | July 2, 1940 |
| 2,254,812 | Aller | Sept. 2, 1941 |
| 2,540,961 | Osplack | Feb. 6, 1951 |
| 2,546,155 | Haber | Mar. 27, 1951 |
| 2,553,129 | Burnett | May 15, 1951 |
| 2,554,171 | Brunot | May 22, 1951 |
| 2,661,542 | Bean | Dec. 8, 1953 |

FOREIGN PATENTS

| | | |
|---|---|---|
| 622,319 | Great Britain | Apr. 29, 1949 |

OTHER REFERENCES

Clarkator Catalogue, Clark Instrument Co., Dearborn, Michigan. (Copy in Div. 66 since Oct. 18, 1947.)